UNITED STATES PATENT OFFICE.

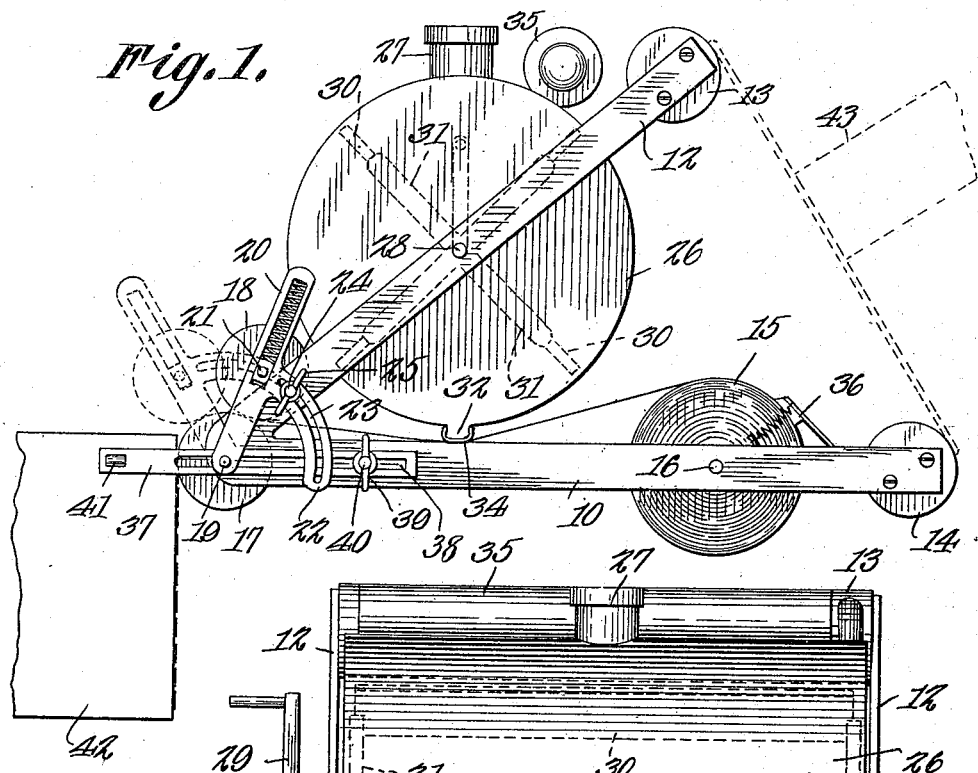
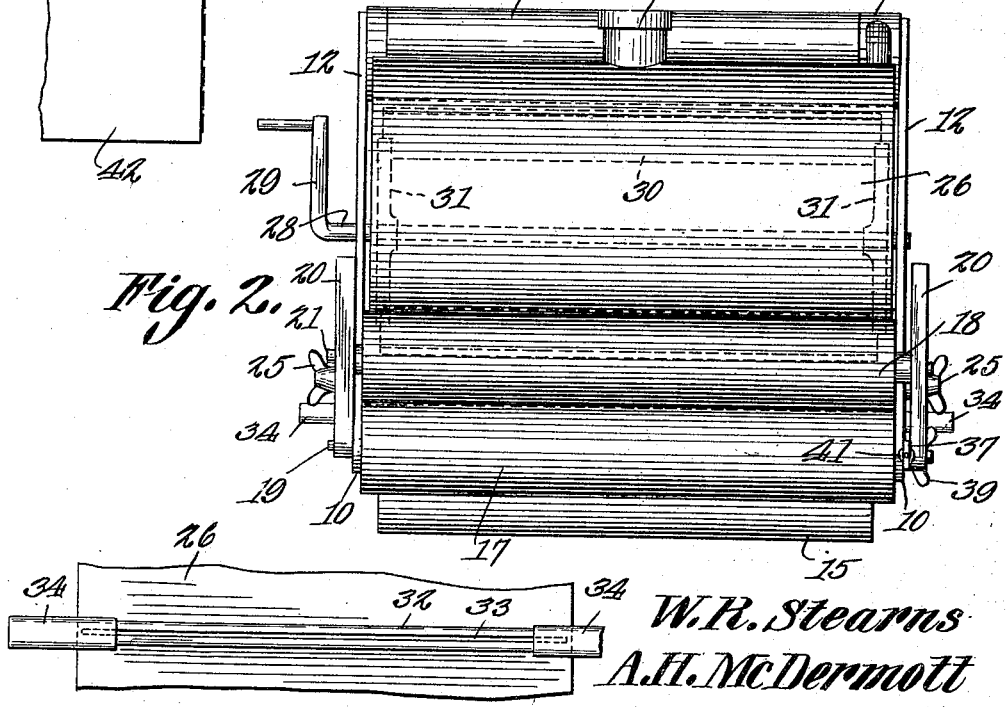

WORTH R. STEARNS AND ALBERT H. McDERMOTT, OF SPOKANE, WASHINGTON.

LABEL-AFFIXER.

1,203,660.

Specification of Letters Patent.  Patented Nov. 7, 1916.

Application filed October 29, 1915.  Serial No. 58,583.

*To all whom it may concern:*

Be it known that we, WORTH R. STEARNS and ALBERT H. McDERMOTT, citizens of the United States, residing at Spokane, in the county of Spokane and State of Washington, have invented certain new and useful Improvements in Label-Affixers, of which the following is a specification.

This invention relates to appliances for pasting labels on boxes and other containers, and its object is to provide a novel and improved hand-operated device of this kind which is efficient and rapid in operation, and simple and inexpensive in construction.

Other objects and advantages of the invention will be pointed out in the detailed description appearing hereinafter, and in order that the same may be better understood, reference is had to the accompanying drawing, in which—

Figure 1 is a side elevation of the device; Fig. 2 is a front elevation thereof, and Fig. 3 is a plan view of the paste reservoir outlet.

Referring specifically to the drawing, the supporting frame of the device comprises two parallel, laterally spaced, longitudinal bars 10 having at one end upstanding arms or branches 12 which slant rearward to overhang the bars 10. The outer ends of the arms 12 are provided with a cross handle 13, and the rear ends of the bars 10 are also equipped with a cross handle 14. By means of these two handles the device is grasped and operated. Adjacent to the handle 14, between the bars 10, is mounted a roll 15 of labels, the same being positioned on a spindle 16 extending between and carried by the bars 10. Between the forward ends of the bars 10 is mounted a label-affixing roller 17, and operating in conjunction with the latter is a spring-pressed tension roller 18.

The shaft 19 of the roller 17 is supported by the bars 10, and on said shaft are pivoted two laterally spaced arms 20 which carry the roller 18, the shaft 21 of said roller being supported by said arms and extending therebetween. The object of the pivoted support for the roller 18 is to allow the same to be swung down in front of the roller 17, as shown dotted in Fig. 1, for a purpose to be presently described. From the arms 20 extend curved branches 22 having slots 23 to receive bolts 24 carried by the arms 12, and by means of wing nuts 25 screwed on said bolts, the arms 20 are locked to hold the roller 18 in operative position.

Between the arms 12 is mounted a cylindrical paste reservoir 26 positioned horizontally and transversely. The top of the reservoir has a filler nipple 27 provided with a suitable closure. The reservoir is stationary, and through the center thereof passes a shaft 28 which is journaled in the arms 12, one end of the shaft having a crank handle 29. Inside the reservoir 26, the shaft 28 carries agitators for stirring the paste when necessary. These agitators are wooden blades 30 extending in the direction of the length of the reservoir, and carried by radial arms 31 fixed on the shaft, the blades being positioned near the inner periphery of the reservoir.

At the bottom of the reservoir 26, in the vertical center thereof, is a gutter 32 extending in the direction of the length of the reservoir, and having a longitudinal outlet slot 33. On the outside of the gutter, over the slot, are slidably mounted covers 34, by means of which latter more or less of the slot may be covered, so that the outlet may be adjusted to the width of the labels to be affixed.

The paste is preferably forced from the reservoir 26 by air pressure, a pump 35 being carried by the latter and arranged to discharge thereinto. After putting sufficient air pressure into the reservoir, the paste is forced therefrom through the outlet slot 33.

The roll 15 is engaged by a spring-actuated presser bar 36 carried by the frame bars 10, said presser bar serving to prevent unwinding of the roll when the device is not in use.

One of the frame bars 10 carries a gage for obtaining uniformity in the position of the labels on the box. The gage comprises a bar 37 projecting from the front end of the bar 10, so that it may be placed against the side of the box adjacent to the side on which the label is to be pasted. The gage bar has a longitudinal slot 38 to clear the shaft 19, and it is adjustably clamped to the bar 10 by a wing nut 39 screwed on a bolt 40 carried by said bar and passing through the slot. The outer end of the gage bar has a roller 41 which runs on the side of the box which guides the device.

In operation, the roll 15 being in place, the strip of labels is carried forward under the outlet slot 33 of the paste reservoir 26, and drawn between the rollers 17 and 18, with enough of the first label projecting from the roller so that it may be placed on the box or other container shown at 42 in Fig. 1. Paste is applied to the label strip through the slot 33, the reservoir being pumped up to force out the paste, as hereinbefore described. The label is affixed to the box by an upward stroke of the device, and by pressing the label to the box by the roller 17. As the roller 17 travels upward on the box, the strip of labels is drawn forward off the roll 15, and when the next label to be affixed has passed far enough between the rollers 17 and 18, the affixed label is torn off the strip, leaving enough of the next label projecting from the rollers so that it may be affixed to the next box. The labels are preferably separated by rows of perforations, so that they may be readily torn off.

Whenever necessary, the paste in the reservoir 26 can be stirred up by turning the crank handle 29.

When the device is to be used for applying labels to horizontal surfaces, the roller 18 is swung down in front of the roller 17, as shown dotted in Fig. 1. One of the objects of the invention is to enable the device to affix labels to horizontal, as well as to vertical surfaces, and to start the label under the roller 17 when applying labels to horizontal surfaces, it is necessary to swing the roller 18 down as described.

The device can be used for applying wall paper, small advertising posters, strips to seal ends of packages, and to apply any sheet material to any surface.

In the construction of smaller machines, such as would be used for labels up to, say four inches wide, the modified handle structure shown dotted at 43 in Fig. 1 may be used.

Various other changes and modifications in the structure may also be made without a departure from the spirit and scope of the invention as claimed hereinafter.

We claim:

1. A label affixer comprising a supporting frame, a label roll support, an affixing roller in front of the roll support, a paste reservoir between said support and roller, and having an outlet across which the label strip travels, a tension roller opposite the affixing roller, between which rollers the label strip passes, and a pivoted support for the tension roller.

2. A label affixer comprising a supporting frame, a label roll support, an affixing roller in front of the roll support, a paste reservoir between said support and roller, and having an outlet across which the label strip travels, a tension roller opposite the affixing roller, between which rollers the label strip passes, a pivoted support for the tension roller, and means for locking said support to the supporting frame.

3. A label affixer comprising a supporting frame, a label roll support, an affixing roller in front of the roll support, a paste reservoir between said support and roller, and an edge-guided gage bar extending forward from the supporting frame.

4. A label affixer comprising a supporting frame consisting of laterally spaced bars having upstanding arms at their forward ends, said arms being inclined rearward, handles carried by the rear ends of the bars and the arms, a paste reservoir supported between the arms and having a bottom outlet, a label roll support supported between the rear ends of the bars, and an affixing roller supported between the front ends of the bars, the reservoir outlet being located between said roller and the roll support.

5. A label affixer comprising a supporting frame consisting of laterally spaced bars having upstanding arms at their forward ends, said arms being inclined rearward, handles carried by the rear ends of the bars and the arms, a paste reservoir supported between the arms and having a bottom outlet, a label roll support mounted between the front ends of the bars, an affixing roller between the front ends of the bars, a shaft supporting said roller and carried by the bars, arms pivoted on said shaft, a tension roller carried by said arms and located opposite the affixing roller, and means for locking the arms which carry the tension roller.

In testimony whereof we affix our signatures in the presence of two witnesses.

WORTH R. STEARNS.
ALBERT H. McDERMOTT.

Witnesses:
CHAS. McCOY,
MILLER J. SHAFFER.